United States Patent [19]
Hayashi

[11] 3,710,587
[45] Jan. 16, 1973

[54] CONTROL SYSTEM FOR A VEHICLE AIR-CONDITIONER

[76] Inventor: Yoshimasa Hayashi, Kudencho-Danchi 4-201, No. 740, Yokohama, Japan

[22] Filed: Dec. 14, 1970

[21] Appl. No.: 97,518

[30] Foreign Application Priority Data

Dec. 13, 1969  Japan..................................44/99854

[52] U.S. Cl. .........................62/230, 62/243, 62/323
[51] Int. Cl.................................................F25b 1/00
[58] Field of Search ....62/230, 243, 323; 123/32 EA; 192/.076

[56] References Cited

UNITED STATES PATENTS

| | | | |
|---|---|---|---|
| 3,121,314 | 2/1964 | Koyanagi | 62/243 X |
| 3,462,964 | 8/1969 | Haroldson | 62/323 X |
| 3,470,854 | 10/1969 | Eisele et al. | 123/32 EA |
| 3,463,130 | 8/1969 | Reichardt et al. | 123/32 EA |
| 3,602,005 | 8/1971 | Kaye | 62/323 X |
| 3,186,184 | 6/1965 | Pruitt | 62/323 X |
| 2,187,712 | 1/1940 | Neeson | 62/323 X |
| 3,459,006 | 8/1969 | Hoyer | 62/323 X |

*Primary Examiner*—William F. O'Dea
*Assistant Examiner*—P. D. Ferguson
*Attorney*—Robert E. Burns and Emmanuel J. Lobato

[57] ABSTRACT

A control system for controlling the application of a driving input to the compressor of a vehicle air-conditioner only when the vehicle engine is producing sufficient extra power. The control system is provided with detection devices that detect at least two varying physical variables, such as engine speed and intake manifold vacuum or pressure, that are related to the power output of the engine. The physical variables thus represent operating conditions of the engine and a control signal is developed in dependence upon these operating conditions for controlling application of engine power output to the air-conditioner compressor only when engine operating conditions obtain that are indicative of available excess power of the engine for driving the compressor.

13 Claims, 1 Drawing Figure

PATENTED JAN 16 1973 3,710,587
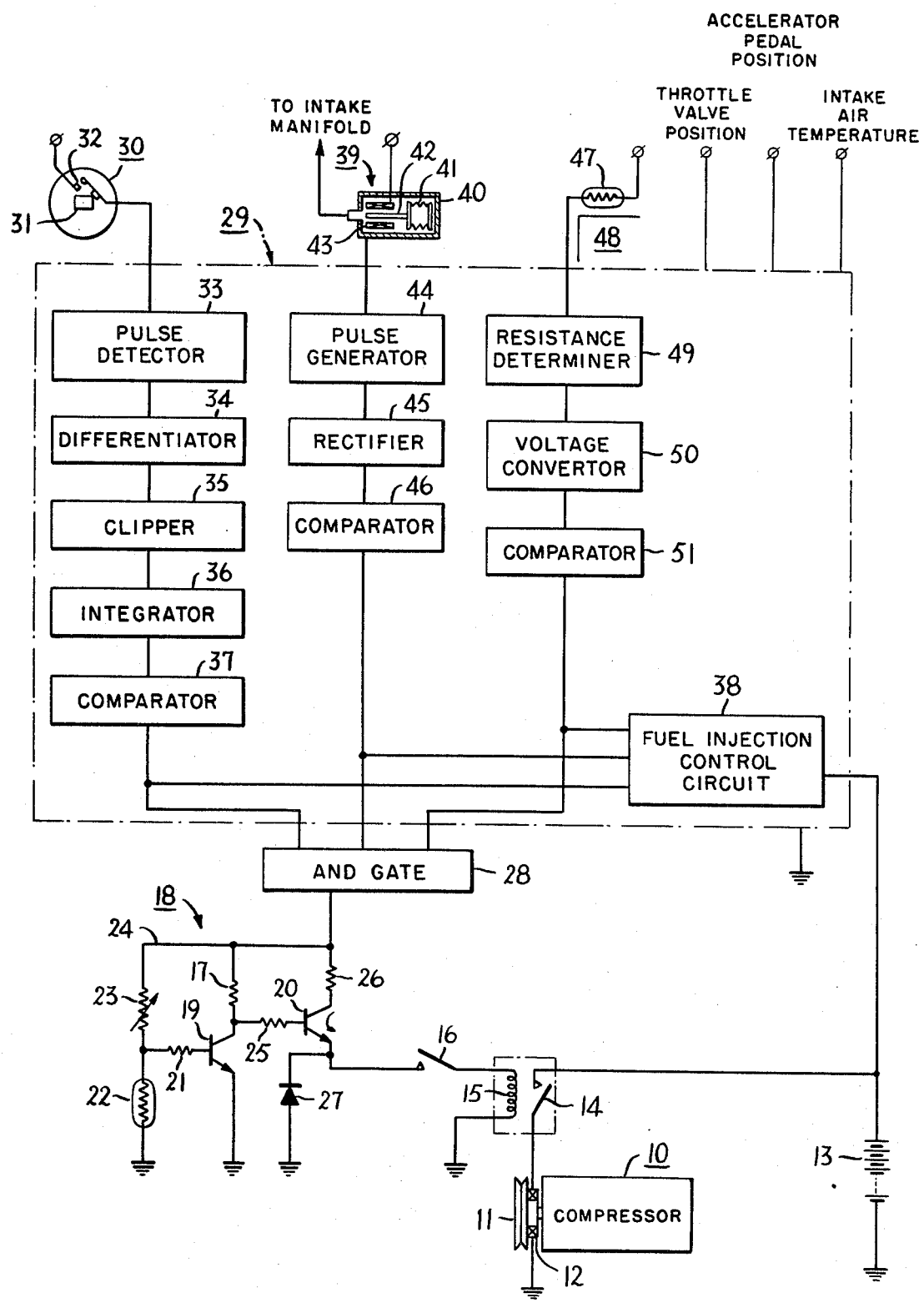

CONTROL SYSTEM FOR A VEHICLE AIR-CONDITIONER

This invention relates generally to an automotive air-conditioner and more particularly to a control system for use in controlling an automotive air-conditioner.

Most modern automobiles are equipped with an air-conditioner. Since the compressor of the air-conditioner imposes a high load on the engine, however, the installation of the air-conditioner is limited to automobiles having a high power output engine and accordingly large cylinder capacity. In order to eliminate this limitation, an electrically operated clutch is employed in an automobile of relatively small cylinder capacity and power output. The clutch acts to declutch the compressor from the engine when the engine is idling with the throttle valve fully throttled, that is, when the engine is producing no extra power for driving the compressor. More specifically, the electrically operated clutch is deenergized upon detection of the idling operation by means of a switch associated with the throttle valve position. In conventional air-conditioners, however, the switch is liable to unnecessarily declutch the clutch to render the air-conditioner inoperative, even when the automobile is going downhill with sufficient extra power and while being braked by the engine. This is due to the fact that the throttle valve is kept fully closed during the particular period of time. In this way, there has been encountered the drawback that while the engine is generating sufficient power the air-conditioner itself remains inoperative. As a result, the temperature within the automobile passenger space rises. If, in this instance, the compressor is kept coupled with the engine while the automobile is decending a slope an advantage is obtained in that the braking force on the engine is increased.

On the other hand, when the automobile is traveling uphill and/or being accelerated abruptly at a reduced throttle condition, the compressor of the conventional air-conditioner is not declutched from the engine, while the engine itself is not producing an extra power for driving the air-conditioner. This is reflected in the drawback that sufficiently high power required for the ascending and/or accelerating operations is greatly reduced. In order to couple the compressor with the engine, therefore, it is sometimes necessary to manually operate the switch. This manual operation will obviously turn out to be troublesome for the driver.

It is therefore an object of this invention to provide a novel amd improved control system for an automotive air-conditioner with a view to overcoming the drawbacks described above.

Another object of the invention is to provide a control system which automatically couples a compressor with the engine only when the engine is producing extra power, sufficient for driving the compressor.

Still another object is to provide a control system which is operable only when the engine is running without being overheated.

Another object is to provide a control system which is responsive to engine speed and intake manifold vacuum.

Still another object is to provide a control system for a vehicle air-conditioner which is responsive to engine temperature.

A feature of the control system according to the invention is that it is particularly applicable to compact automobiles that have a relatively small engine and power output thereof is applied to an air-conditioner only when excess power obtains.

The control system for the compressor of a vehicle air conditioner provides for driving the compressor as a function of the operating conditions of a source of motive power or engine. The control system is provided with means for detecting at least two physical variables corresponding to variable operating conditions of a source of motive power and related with the power output thereof. Means coactive with the detecting means develop a plurality of outputs which correspond respectively to the physical variables. These outputs are developed only when the power output of the source of motive power obtains at a predetermined level. The two outputs are received by means which develops as control output or signal only when the two outputs are concurrently applied thereto. Clutching and declutching means control application of power output of the source of motive power to the compressor of the vehicle air-conditioner under control of the control output of the means receiving the two concurrent outputs representative of the physical variables.

Provision is made in the control system for sensing the temperature of the passenger space of the vehicle on which it is mounted by use of a thermister and unblocking a blocked transistor to control application of the control output to an electric clutch that applies drive to the air-conditioner compressor when a certain passenger space temperature is exceeded and when the engine has the necessary excess power to drive the compressor.

The single FIGURE is a schematic diagram of a control system for a vehicle air-conditioner according to the invention.

In the drawing a compressor 10 compresses a vaporized refrigerant after it leaves an evaporator, not shown. The compressor 10 may be mounted on the side of a source of motive power or an engine, not shown of a vehicle, and is driven from the engine, by a V-belt, not shown, through a pully 11. An electric clutch 12 declutches the compressor 10 from the pulley 11 when air-conditioning is not wanted. The electric clutch 12 is electrically connected to a power source or battery 13 through a relay switch 14. The relay switch 14 is actuated by a relay coil 15 having one end grounded. The other end of the relay coil 15 is connected to a manual power switch 16 which in turn is connected to an automatic temperature controller 18.

The automatic temperature controller 18 includes two series transistors 19, 20, the first of which has its emitter connected to ground. The base of the first transistor 19 is connected to a resistor 21 connected to one end of a thermistor 22 which detects the temperature inside an automobile passenger space, not shown. The other end of the thermistor 22 is connected to ground. The base of the first transistor 19 is connected to a variable resistor 23 which, together with the thermistor 22, forms a voltage divider. The variable resistor 23 is connected to a bus line 24. The first transistor 19 has its collector connected through a resistor 17 to the bus line 24. The collector of the first transistor is also connected to the base of the second series transistor 20 through a resistor 25. The second transistor 20 has its collector connected to the bus line 24 through a resistor 26 and has its emitter connected to ground by a diode 27. The emitter of the second transistor 20 is also connected to the manual switch 16. The bus line 24 of the automatic temperature controller 18 is connected to an AND gate 28 which forms a major part of the present control system for an automotive air-conditioner. The AND gate 28 has three inputs which are connected to an electronically controlled fuel injection system 29.

The electronically controlled fuel injection system 29 may be of any conventional type having at least two inputs to which are supplied various signals indicating together with another signal (to be described) an engine operating condition in which the engine is producing an extra power sufficient for driving the compressor 10 without affecting the enginer. One of these signals is a pulse train signal indicating engine speed and is generated by an engine-driven pulse train generator 30. The pulse train generator 30 comprises a cam 31 mounted on an engine driven shaft (not shown) and a triggering switch 32 actuated by the cam 31 for generating the pulse train. Thus, the pulse train has a repetition rate which is proportional to the number of revolutions of the engine.

The pulse signal is applied from the pulse train generator 30 to first means coactive the pulse train generator for producing an output signal when the repetition rate of the pulse train is above a predetermined value. The first means comprises a pulse train detector 33, a differentiator 34, a clipper 35, an integrator 36 and a first comparator 37, through all of which the pulse train is processed in this sequence. The pulse train is supplied to the pulse train detector 33 and then to the differentiator 34 for differentiation. Thereafter, it is clipped and integrated by the clipper 35 and integrator 36, respectively, to produce a dc voltage proportional to the engine speed. The dc voltage is then supplied to the first comparator 37 where the dc voltage is compared with a predetermined voltage level. The comparator 37 is adapted to produce an output signal when the engine speed is above a predetermined level, such as 800 rpm, in the case where the engine speed during idling is set at 600 rpm. When the engine speed is below the predetermined value, the output signal is cut off by the comparator 37. The output of the comparator 37 is connected to one of the three inputs of the AND gate 28 so that the output signal is passed to the AND gate 28 when the engine speed is above the predetermined level. The comparator 37 may be connected also to a usual fuel injection control circuit 38, shown in a block form. In other words, the fuel injection control circuit 38 is provided with such engine speed detecting means as including the pulse train generator 30 and the first means.

The other signal indicating the engine operating condition is also applied to the electronically controlled fuel injection system 29. The signal indicates absolute pressure in the intake manifold. This signal is generated by bellows means 39 comprising a cylindrical housing 40, a bellows 41, a rod 42 and a differential transformer 43. The cylindrical housing 40 defines a chamber communicating with the intake manifold. The bellows 41 is filled with a gas such as air, at a certain pressure level and is secured at its one end to the inner end of the housing 40. The bellows 41 is free to expand and contract axially of the housing 40 in response to the difference variations between the pressure therein and the pressure in the chamber. The rod 42 is secured at its one end to the end of the bellows 41 that is free to move and extends along the axis of the housing 40 toward the other inner end thereof. The differential transformer 43 is disposed in the housing 40 relative to the bellows 41 and receives an end portion of the rod 42. With this construction arrangement, the differential transformer 43 converts the axial displacement of the rod 42 into a voltage proportional to the absolute pressure or vacuum level of the intake manifold vacuum.

The voltage thus generated in the bellows means 39 is supplied to second means coactive with the bellows means 39 for producing an output signal when the voltage proportional to the absolute level is above a predetermined level. In more detail, the voltage is applied to a pulse generator 44 which generates a single pulse having its width proportional to the absolute intake manifold pressure. The pulse signal is then applied to a rectifier 45 to produce a dc voltage which is proportional to the absolute pressure. The dc voltage is further applied to a second comparator 46 which functions to compare the dc voltage with a predetermined voltage level and to produce an output signal when the dc voltage is below the predetermined level. The predetermined voltage level corresponds to, for example, 700 mmHg in the absolute level of the intake manifold vacuum. The output of the comparator 46 is also connected both to one of the three inputs of the AND gate 28 and to the fuel injection control circuit 38.

As is apparent from the above discussion, it is to be appreciated that the control system of this invention can drive the compressor of an automotive air-conditioner, by detecting engine speed and intake manifold vacuum, only when the engine is producing sufficient extra power. Moreover, it should be appreciated that, since an automobile having an electronically controlled fuel injection system is provided with such system as detecting the engine speed and intake manifold vacuum, this detecting system can be diverted, as it is, to the engine operation detector for the control system of the invention.

Another signal indicating engine temperature may be applied to the fuel injection system 29, if it is preferred to prevent the engine from being overheated. This signal is generated by a resistance element or thermistor 47 mounted on the engine housing 48 so as to produce an output signal having a resistance decreasing with the increase of the temperature of the coolant circulating within the engine. This output signal thus generated is passed to third means (not numbered) including a resistance determiner 49, a voltage convertor 50 and a third comparator 51. More specifically, the output signal is supplied to the resistance determiner and then to the voltage converter, where the determined resistance is converted into a dc voltage corresponding thereto. This dc voltage is then applied to the third comparator which functions to produce an output signal when the voltage is below a predetermined level corresponding to, for example, 90°C. This temperature level is considered a measure of an engine temperature above which driving of the compressor tends to cause overheating of the engine. The output signal is applied to one of the three inputs of the AND gate 28 and also to the fuel injection control circuit 38.

The fuel injection control circuit 38 may receive other signals indicating engine operation condition, such as throttle valve position, accelerator pedal position and/or intake air temperature, if desired.

In the operation of the control system shown in the FIGURE, when the output signals of the three comparator circuits 37, 46 and 51 are concurrently supplied to the corresponding input terminals of the AND gate 28, the AND gate 28 produces an output signal which is applied to the following automatic temperature controller 18.

As described before, the automatic temperature controller 18 has a voltage divider consisting of the thermistor 22 and the variable resistor 23. The variable resistor 23 may be adjusted so that when the temperature inside the passenger space rises to a preset value the potential at the base of the transistor 19 is sufficiently reduced to render it non-conductive. With the transistor 19 rendered nonconductive, the voltage at the collector thereof is built up, causing the gating transistor 20 to become conductive. Therefore, when the temperature is above the preset value and the AND gate 28 has three input signals concurrently applied at its inputs, the output signal issuing from the AND gate 28 is passed through the transistor 20 and the manual switch 16 to the relay coil 15 to thereby energize the relay switch 14. Energization of the relay switch 14 causes the compressor 10 to be clutched to the engine. Then, the air-conditioner begins to operate.

As an example, the conditions under which an electric signal is applied to each input of the AND gate 28 may be as follows:

Engine speed ≧ 800 rpm
Absolute intake manifold pressure ≦ 700 mmHg
Engine temperature ≦ 90°C.

As is understood, when the above-stated conditions are satisfied at the same time, the engine has extra power sufficient for driving the compressor of the air-conditioner. More specifically, during idling operation when the engine has only a small amount of power output, the engine speed is below 800 rpm and therefore no electric signal is applied to the corresponding input of the AND gate 28. As a result, the AND gate 28 has no such output as to actuate the compressor 10.

When the automobile is going downhill, producing a large amount of power output, the engine speed rises above 800 rpm and the absolute intake manifold pressure decreases below 700 mmHg with the engine temperature less than 90°C, so that the AND gate 28 produces an output signal which is passed to the temperature controller 18.

On the other hand, when the automobile is accelerated abruptly and/or running uphill, the absolute pressure developed in the intake manifold rises above 700 mmHg, so that the input signal from the comparator 46 is cut off. Therefore, the air-conditioner is not operated during abrupt acceleration and/or ascending operations, that is, when a large amount of power is required to drive the engine crankshaft.

Furthermore, when the engine temperature rises to a value above 90°C, the comparator 51 applies no output signal to the input of the AND gate 28 and accordingly the compressor 10 is declutched from the engine. This will reduce undesirable heat generation in the engine due to the operation of the compressor 10 to thereby prevent overheating of the engine.

What I claim and desire to be secured by letters patent is:

1. A control system for controlling driving of a compressor as a function of operating conditions of a source of motive power for driving the compressor comprising, first means for detecting three physical variables corresponding to variable operating conditions of a source of motive power and related with the power output thereof, second means coactive with said first means to developing a plurality of outputs corresponding respectively to the physical variables only and the power output of the source of motive power obtains at a predetermined level, third means receptive of the outputs of the second means for developing an output only when said outputs are concurrently supplied thereto, and fourth means for clutching and declutching the power output of the source of motive power to nd from the compressor under control of the output of the third means.

2. A control system for controlling driving of a compressor as a function of operating conditions of a source of motive power for driving the compressor comprising, first means for detecting at least two physical variables corresponding to variable operating conditions of a source of motive power and related with the power output thereof, said first means including a pulse train generator driven from the source of motive power for generating a pulse train the repetition rate of which is proportional to the speed of the source of motive power, expansible and contractible bellow means deformable in response to an intake manifold vacuum of the source of motive power, means coactive with said bellow means for electromagnetically converting the expansion and contraction of said bellow means into a voltage proportional to the absolute level of the intake manifold vacuum, and resistance means mounted in use on the source of motive power for producing an output having a resistance decreasing with the increase of the temperature of the source of motive power, second means coactive with said first means for developing a plurality of outputs corresponding respectively to the physical variables only when the power output of the source of motive power obtains at a predetermined level, said second means including means for producing one of the outputs of the second means when the repetition rate of the pulse train is above a predetermined value, means for producing a second of the outputs of the second means when the voltage proportional to the absolute level of the intake manifold vacuum is above a predetermined level, means for producing a third of the outputs of the second means when the resistance of the output of said resistance means is above a predetermined value, third means receptive of the outputs of the second means for developing an output only when said outputs are concurrently supplied thereto, and fourth means for clutching and declutching source of motive power to and from the compressor under control of the output of the third means.

3. A control system according to claim 2, in which said fourth means comprises means rendered effective for coupling the power output of the source of motive power to the compressor upon reception of the output of said third means.

4. A control system according to claim 2, in which said source of motive power comprises an intake manifold and in which said pulse train generator comprises a cam driven from the source of motive power, and a triggering switch driven by said cam for generating said pulse train; and in which said bellows means comprises a housing defining a chamber communicating with said intake manifold of the source of motive power, a gas-filled bellows at a predetermined pressure and secured to said housing, said bellows being disposed to expand and contract in said housing in response to the difference variations between the predetermined pressure therein and the pressure in said chamber, a rod secured to said gas-filled bellows and movable in said housing when said bellows expands and contracts, and a differential transformer mounted in said housing disposed relative to said gas-filled bellows for receiving said rod and electromagnetically converting the displacement of said rod into said voltage proportional to the absolute level of the intake manifold vacuum.

5. A control system according to claim 2, in which said means for producing one of the outputs when the repetition rate of the pulse train is above a predetermined level comprises a pulse train detector receptive of said pulse train for detecting said pulse train, a differentiator receptive of the detected pulse train for differentiating said detected pulse train, a clipper receptive of the differentiated pulse train for clipping said differentiated pulse train, an integrator receptive of the clipped pulse train for generating a voltage proportional to the speed of revolution of the source of motive power, a first comparator receptive of the voltage generated by said integrator for comparing said voltage with a predetermined voltage level and for producing said one of the outputs of the second means when the speed of revolution of the source of motive power is above a predetermined level; and in which said means for producing another of the outputs of said second means comprises a pulse generator receptive of said voltage converted by said bellows means for generating a single pulse the width of which is proportional to the absolute level of the intake manifold vacuum, a rectifier receptive of the single pulse generated by said pulse generator for rectifying said single pulse and for generating a voltage porportional to the width of said single pulse, and a second comparator receptive of the voltage generated by said rectifier for comprising said voltage generated by said rectifier with a predetermined voltage level and for producing said another of the outputs of the second means when the absolute level of the intake manifold vacuum is below a predetermined level.

6. A control system according to claim 2, in which said other means for producing another of the outputs of said second means comprises a resistance determiner receptive of the output produced by said resistance means for determining the resistance of said output produced by said resistance means, a voltage converter connected to said resistance determiner for converting the resistance converted by said resistance determiner into a voltage corresponding to the value of said resistance, and a third comparator receptive of the voltage converted by said voltage converter for comparing said voltage converted by said voltage converter with a predetermined voltage level to produce said another of the outputs of the second means when the temperature of the source of motive power is below a predetermined level.

7. A control system according to claim 2, further comprising fifth means for sensing a temperature in a space including means rendered conductive to allow passage of said output of said third means to the fourth means when the temperature sensed in said space is above a predetermined level, whereby the fourth-named means clutches the power output of the source of motive power to the compressor when said temperature in said space is above said predetermined level.

8. A control system according to claim 7, in which said fifth means comprises a voltage divider including a thermistor in said space for sensing the temperature therein and a variable resistor connected to said thermistor, said means rendered conductive comprising a transistor for gating said output of the third means in accordance with the voltage divided by said voltage divider, and another transistor connected between said thermistor and variable resistor for rendering conductive the first-mentioned transistor.

9. In combination with a vehicle air-conditioner compressor, a control system for controlling driving of said compressor as a function of operating conditions of an engine of a vehicle, said control system comprising first means mounted in use on an engine of a vehicle for detecting three physical variables corresponding to variable operating conditions of said engine relating to the power output of said engine, second means coactive with said first means for developing a plurality of outputs corresponding respectively to the physical variables only when the power output of said engine obtains at a predetermined level, third means receptive of the outputs of the second means for developing an output only when said outputs are concurrently supplied thereto, and fourth means for clutching and declutching the power output of said engine to and from said compressor under control of the output of the third means.

10. A control system according to claim 9, in which said fourth means for clutching and declutching comprises means rendered effective for coupling the power output of said engine to said compressor upon reception of the output of said third means.

11. A control system according to claim 9, in which said first means comprises a pulse train generator driven from the source of motive power for generating a pulse train the repetition rate of which is proportional to the speed of the source of motive power, expansible and contractible bellow means deformable in response to an intake manifold vacuum of the source of motive power, means coactive with said bellow means for electromagnetically converting the expansion and contraction of said bellow means into a voltage proportional to the absolute level of the intake manifold vacuum, and resistance means mounted in use on said engine for producing and output having a resistance decreasing with the increase of the temperature of said engine, second means coactive with said first means for developing a plurality of outputs corresponding respectively to the physical variables only when the power output of said engine obtains at a predetermined level, said second means including means for producing one of the outputs of the second means when the repetition rate of the pulse train is above a predetermined value, means for producing a second of the outputs of the second means when the voltage porportional to the absolute level of the intake manifold vacuum is above a predetermined level, and means for producing a third of the outputs of the second means when the resistance of the output of said resistance means is above a predetermined value.

12. In combination with a vehicle air-conditioner compressor mounted on a fuel injection engine driven vehicle, a control system for controlling driving of said compressor as a function of operating conditions of a fuel injection engine of a vehicle, said control system comprising, first means mounted in use on a fuel injection engine of a vehicle for detecting three physical variables, which are selected from parameters to be applied to a control system of said fuel injection engine, corresponding to variable operating conditions of said fuel injection engine and related with the power output thereof, second means coactive with said first means for developing a plurality of outputs corresponding respectively to the physical variables only when the power output of said engine obtain at a predetermined level, third means receptive of the outputs of the second means for developing an output only when said outputs are concurrently supplied thereto, and fourth means for clutching and declutching the power output of said engine to and from the compressor under control of the third means.

13. In combination with a vehicle air-conditioner mounted on a fuel injection engine driven vehicle, a control system for controlling driving of said compressor as a function of operating conditions of a fuel injection engine of a vehicle, said control system comprising, first means for detecting three physical variables corresponding to variable operating conditions of a source of motive power and related with the power output thereof, said first means including a pulse train generator driven from the source of motive power for generating a pulse train the repetition rate of which is proportional to the speed of the source of motive power, expansible and contractible bellow means deformable in response to an intake manifold vacuum of the source of motive power, means coactive with said bellow means for electromagnetically converting the expansion and contraction of said bellow means into a voltage proportional to the absolute level of the intake manifold vacuum, and resistance means mounted in use on said engine for producing an output having a resistance decreasing with the increase of the temperature of said engine, second means coactive with said first means for developing a plurality of outputs corresponding respectively to the physical variables only when the power output of said engine obtains at a predetermined level, said second means including means for producing one of the outputs of the second means when the repetition rate of the pulse train is above a predetermined value, means for producing a second of the output of the second means when the voltage proportional to the absolute level of the intake manifold vacuum is above a predetermined level, means for producing a third of the outputs of the second means when the resistance of the output of said resistance means is above a predetermined value, third means receptive of the outputs of the second means for developing an output only when said outputs are concurrently supplied thereto, and fourth means for clutching and declutching source of motive power to and from the compressor under control of the output of the third means.

* * * * *